United States Patent

El Sayed et al.

[11] Patent Number: 5,965,652
[45] Date of Patent: Oct. 12, 1999

[54] THERMALLY STABLE COPPER-CONTAINING POLYAMIDE MOLDING COMPOUNDS

[75] Inventors: Aziz El Sayed, Leverkusen; Edgar Ostlinning, Düsseldorf; Alban Hennen, Leverkusen; Georg Heger, Krefeld; Werner Nielinger, Krefeld; Karsten-Josef Idel, Krefeld; Klaus Sommer, Bergisch Gladbach; Raymond Audenaert, Hamme, all of Germany

[73] Assignee: Bayer AG, Leverkusen, Germany

[21] Appl. No.: 08/194,515

[22] Filed: Feb. 10, 1994

[30] Foreign Application Priority Data

Feb. 19, 1993 [DE] Germany ............... 43 05 166

[51] Int. Cl.⁶ ................................... C08K 5/098
[52] U.S. Cl. ............................ 524/413; 524/606
[58] Field of Search .................... 524/413, 414, 524/419, 606, 612

[56] References Cited

U.S. PATENT DOCUMENTS 2,705,227  3/1955  Stamatoff .................. 524/413
2,960,489  11/1960 Gabler et al. ............... 524/413
3,280,052  10/1966 Watanabe et al. ........... 524/606
3,308,091  3/1967  Zapp ........................... 524/83
3,384,616  5/1968  Heller et al. ............... 524/606
3,499,867  3/1970  Nakamura et al. .......... 524/413
3,691,131  9/1972  Kelmchuk ................... 524/413
3,814,728  6/1974  Bostic et al. .
3,947,424  3/1976  Tomek .
4,745,006  5/1988  Mohajer ..................... 427/222
4,851,466  7/1989  Plischke et al. ............ 524/606

FOREIGN PATENT DOCUMENTS 1 545 754  11/1968  France .
1 581 934  9/1969   France .

OTHER PUBLICATIONS

Hackh's Chemical Dictionary—pp. 222 & 223, 4th edition (1969).

*Primary Examiner*—Veronica P. Hoke
*Attorney, Agent, or Firm*—Connolly, Bove, Lodge, & Hutz

[57] ABSTRACT

The invention relates to thermally stable and UV-stable polyamide molding compounds containing colloidal copper formed in situ and to a process for their production.

7 Claims, No Drawings

THERMALLY STABLE COPPER-CONTAINING POLYAMIDE MOLDING COMPOUNDS

This invention relates to polyamide molding compounds containing colloidal copper formed in situ which combine improved thermal and UV stability with very good mechanical properties and to a process for their production.

Polyamide molding compounds are high-quality thermoplastics which are distinguished by high heat resistance, very good mechanical properties, high toughness, high resistance to chemicals and ready processability. The properties of polyamides can be considerably extended by reinforcement with glass fibers, glass beads, mineral fillers and mixtures thereof. Modification with elastomers improves the impact strength of polyamides. By virtue of the large number of possible combinations, new products tailored for special applications are always being developed.

New applications are always being found for polyamides. Increasingly more stringent requirements in regard to mechanical properties are generally coupled with the need for improved thermal stability and possibly even UV stability. The range of applications of polyamides includes fibers, films, hotmelt adhesives and moldings for the electrical, construction, furniture and automotive industries.

The poor stability of polyamides to thermal oxidation and to the effect of light has been known for some time. Many stabilizer systems have been published in the literature (see, for example, Vieweg/Müller; Kunststoff Handbuch, Vol. VI, Polyamide, and GB 908,647, DE 1 257 425, DE 2 643 204).

The degradation of the surface of polyamides by oxidation is retarded but not suppressed by stabilizers. In practice, copper and copper salts, i.e. Cu(I), Cu(II) salts or copper complexes individually or in combination with alkali metal halides, phenolic antioxidants or aminic antioxidants, have been successfully used as heat-stabilizing additives.

In the case of heat stabilizers, a measure of the stabilizing effect of additives is the reduction in impact strength after storage at elevated temperatures in recirculating air ovens (120–140° C.).

In the case of UV stabilizers, the time elapsing before a reduction in surface gloss after artificial weathering in a xenon Weatherometer (6000 watt lamp, Pyrex filter, cycle 102:18 mins.) is visually evaluated.

With copper stabilizers, adequate heat stabilization of polyamides is achieved up to a test temperature of 140° C. The copper compounds also have a good stabilizing effect against UV radiation. Copper halides are mainly used, CuI and CuBr having proved to be the most suitable Cu compounds. By combining Cu halides with alkali metal halides, the effect of the Cu salts is distinctly improved. LiBr, KBr or KI is added as the alkali metal halide. The disadvantage is the color of the copper salts. Accordingly, colorless copper complexes are also used to a limited extent.

French patent 906 893 describes fine-particle, electrochemically produced colloidal copper as a heat stabilizer for polyamide films. However, its effect does not significantly surpass that of the copper salts mentioned.

With amine-containing antioxidants, an adequate stabilizing effect is again achieved up to an ageing temperature of 130° C. However, amine-containing antioxidants have a dark color from the outset or tend to discolor heavily in air and on exposure to UV light.

Phenolic antioxidants have a good heat-stabilizing effect up to an ageing temperature of 120° C. Beyond 120° C., the effective stabilizing time is very short.

80% of the polyamides produced worldwide are based on aliphatic polyamides—mainly PA 66 and PA 6 plus small quantities of PA 610 or PA 46.

It is assumed that chromophoric groups are formed at the polyamide surface in the presence of oxygen. These chromophoric groups absorb UV light and form free radicals which lead to weathering of the surfaces. Accordingly, polyamides have to be stabilized against UV light.

Heat stabilizers delay the formation of chromophoric groups in the presence of oxygen and, accordingly, also act as UV stabilizers depending on their effectiveness. The disadvantage lies in the fairly heavy discoloration of light-colored polyamides after weathering where copper salts or aminic antioxidants are used for stabilization. Phenolic antioxidants as stabilizers show a slight UV-stabilizing effect. It is only the combination of phenolic antioxidants with light stabilizers based on hindered amines (HALS= hindered amines light stabilizer) and UV absorbers that provides polyamides with very good weathering resistance.

The present invention relates to polyamide molding compounds having improved heat stability and weathering resistance based on polyamide, copolyamide or blends of polyamides containing elemental fine-particle copper formed in situ as stabilizer. The polyamides may contain aliphatic or aromatic structural elements or mixtures thereof.

It has surprisingly been found that the effect of the copper stabilizer is distinctly enhanced, for example, in the presence of strong reducing agents, such as hypophosphite salts, salts of dithionic acids (dithionates). As XANES spectra (spectra of the near-edge structure of low-energy secondary electrons released by absorbed x rays) show, the copper stabilizer used is partly reduced in situ to elemental copper.

The present invention relates to thermally stable, weather-resistant polyamide molding compounds based on aliphatic or aromatic polyamides, copolyamides or blends thereof, characterized in that, in addition to ionic or complexed Cu stabilizer, they contain from 10 to 2,500 ppm and preferably from 30 to 2,000 ppm fine-particle elemental copper formed in situ. The elemental copper may be formed in situ from the ionic or complexed copper stabilizer in the molding compound or before or during the polymerization of the polyamides used for the molding compound. The present invention also relates to a process for the production of the molding compounds according to the invention, characterized by reduction of the mixture of polyamide or its starting materials with copper stabilizer by, for example, salts of hypophosphorous acid or dithionic acid. The concentration of the reducing agent is preferably from 10 to 5,000 ppm, based on the final molding compound.

Suitable polyamides are partly crystalline polyamides, aromatic or partly aromatic polyamides and amorphous polyamides. Preferred polyamides are polyamide 66, PA 6, PA 46, PA 610, PA 11, PA 12 or copolyamides thereof and also blends of the polyamides mentioned.

Commercially available glass fibers and/or carbon fibers, mineral fibers optionally surface-treated for polyamides are used as reinforcing materials for the molding compounds according to the invention.

Commercially available minerals, such as kaolin, wollastonite, talcum, mica or chalk optionally surface-treated for polyamides, are used as fillers for the molding compounds according to the invention.

Commercially available EP(D)M rubbers or acrylate rubbers with or without functional coupling groups are used as the elastomer modification for the molding compounds according to the invention.

Commercially available lubricants and/or nucleating agents are used as processing additives for the molding compounds according to the invention.

Copper stabilizers for the production of the elemental copper for the molding compounds according to the invention are ionic or complexed copper such as, for example, CuI, CuBr, CuCl, Cu acetate, Cu naphthenate, $CuCO_3$, Cu hydroxide, CuCN, copper hydroxycarbonate or copper complexes based on amines, phosphines, phenols or cyanides.

They are used individually or in admixture with alkali metal halides, such as for example KI, LiBr, KBr.

The elemental copper is produced in the molding compounds, for example during compounding, by addition of salts of hypophosphorous acid or dithionic acid.

Another possibility is to reduce the copper salts in ε-caprolactam and then to polymerize the ε-caprolactam to polyamide 6. Copper-stabilized polyamide concentrates which may be added as stabilizer concentrates to commercially available polyamides can be produced by increasing the concentration of the copper salts in caprolactam and subsequent reduction or polymerization.

The formation of the elemental copper in situ results in partial blackening of the polyamides or polyamide molding compounds.

The following products were used in the following Examples:

Polyamide 6 (PA 6)=Durethan B 31F®, a product of Bayer AG (rel. viscosity $\eta_{rel}$: 3, as measured in a 1% metal cresol solution at 25° C.)

Polyamide 66 (PA 66)=Durethan A30®, a product of Bayer AG (rel. viscosity $\eta_{rel}$: 3, as measured in a 1% metal cresol solution at 25° C.)

Sodium hypophosphite, a product of Merck Darmstadt

EXAMPLES 1 TO 5

The starting materials (for composition, see Table 1) were mixed and extruded in a twin-screw extruder (Werner & Pfleiderer ZSK 32) and the glass fibers were introduced into the melt. The strands obtained were granulated, dried and injection-molded to 80×10×4 mm test specimens. The Izod impact strength was determined by comparison with the starting product after thermal ageing at 140° C. (Table 1).

EXAMPLES 6 TO 10

Examples 1 to 5 were repeated with PA 66 instead of PA 6 (Table 2).

TABLE 1

| Examples | | 1 Comparison | 2 Comparison | 3 Comparison | 4 Comparison | 5 |
|---|---|---|---|---|---|---|
| PA 6 | % | 70.00 | 69.95 | 69.95 | 69.79 | 69.74 |
| Glass fibers | % | 30.00 | 30.00 | 30.00 | 30.00 | 30.00 |
| CuI/KI (1:3) | % | 0.00 | 0.00 | 0.00 | 0.21 | 0.21 |
| Colloidal Cu | % | 0.00 | 0.00 | 0.05 | 0.00 | 0.00 |
| Na hypophosphite | % | 0.00 | 0.05 | 0.00 | 0.00 | 0.05 |
| IZOD after thermal ageing at 140° C.   0 h | KJ/m² | 76 | 75 | 76 | 71 | 80 |
| 500 h | KJ/m² | 33 | 32 | 31 | 43 | 76 |
| 1000 h | KJ/m² | 30 | 29 | 29 | 43 | 72 |
| Time elapsing before reduction in gloss after artifical weathering *) | Hours | 700 | 700 | 700 | 1500 | 3000 |

TABLE 2

| Examples | | 6 Comparison | 7 Comparison | 8 Comparison | 9 Comparison | 10 |
|---|---|---|---|---|---|---|
| PA 66 | % | 70.00 | 69.95 | 69.95 | 69.79 | 69.74 |
| Glass fibers | % | 30.00 | 30.00 | 30.00 | 30.00 | 30.00 |
| CuI/KI (1:3) | % | 0.00 | 0.00 | 0.00 | 0.21 | 0.21 |
| Colloidal Cu | % | 0.00 | 0.00 | 0.05 | 0.00 | 0.00 |
| Na hypophosphite | % | 0.00 | 0.05 | 0.00 | 0.00 | 0.05 |
| IZOD after thermal ageing at 140° C.   0 h | KJ/m² | 70 | 69 | 62 | 61 | 73 |
| 500 h | KJ/m² | 27 | 27 | 28 | 50 | 71 |
| 1000 h | KJ/m² | 25 | 28 | 29 | 38 | 64 |
| Time elapsing before reduction in gloss after artifical weathering *) | Hours | 500 | 500 | 600 | 1300 | 2500 |

*) Artificial weathering in an ATLAS xenon Weatherometer, 6000 W, Pyrex filter, cycle 102:18.

We claim:

1. A thermally stable, weather-resistant polyamide molding composition based on aliphatic or aromatic polyamides, produced by polymerization in the presence of 10 to 5000 ppm, based on composition, of an ionic or complexed copper stabilizer selected from the group consisting of CuBr, CuI, CuCl, Cu carbonate, Cu hydroxycarbonate, CuCN, Cu naphthenate, and copper complexes based on amines, phosphines, phenols or cyanides, which composition contains finely-divided, elemental copper in colloidal form produced in situ from said copper stabilizer by the addition, before or during said polymerization, of 10 to 5000 ppm, based on composition, of a reducing agent selected from the group consisting of hypophosphite salts and salts of dithionic acids.

2. The composition of claim 1, wherein the polyamide is selected from the group consisting of PA 6, PA 66, PA 46, PA 610, PA 11, PA 12, copolyamides thereof, and mixtures of such polyamides or copolyamides.

3. The composition of claim 1, additionally containing a filler or reinforcing material.

4. The composition of claim 1, wherein the reducing agent is added before polymerization.

5. The composition of claim 1, wherein the reducing agent is added during polymerization.

6. A molded article produced from the composition of claim 1.

7. A method of preparing a stable, weather-resistant polyamide molding composition, which comprises polymerizing the polyamide in the presence of 10 to 5000 ppm, based on composition, of an ionic or complexed copper stabilizer selected from the group consisting of CuBr, CuI, CuCl, Cu carbonate, Cu hydroxycarbonate, CuCN, Cu naphthenate, and copper complexes based on amines, phosphines, phenols or cyanides, and in the presence of 10 to 5000 ppm, based on composition, of a strong reducing agent selected from the group consisting of hypophosphite salts and salts of dithionic acid, whereby the reduction of the copper compound forms colloidal copper in situ in the polyamide.

* * * * *